United States Patent [19]

Smith et al.

[11] Patent Number: 5,433,130

[45] Date of Patent: Jul. 18, 1995

[54] SHOULDER DRESSING APPARATUS

[75] Inventors: Jackie E. Smith; Terry L. Fite, both of Houston, Tex.; Clarence J. Hayes, Sunset, La.

[73] Assignee: Grant TFW, Inc., Houston, Tex.

[21] Appl. No.: 122,157

[22] Filed: Sep. 17, 1993

[51] Int. Cl.6 ............................................. B23B 3/24
[52] U.S. Cl. ........................................ 82/113; 82/128; 82/131
[58] Field of Search ................. 82/113, 128, 131; 451/57, 463, 486, 344, 358, 439

[56] References Cited

U.S. PATENT DOCUMENTS

| | | |
|---|---|---|
| 2,159,287 | 5/1939 | Morgan . |
| 2,211,183 | 8/1940 | Tytus . |
| 3,608,406 | 9/1971 | Paysinger .............. 82/113 |
| 3,717,055 | 2/1973 | Pendleton .............. 82/4 C |
| 4,149,436 | 4/1979 | Blattler ................. 82/113 |

OTHER PUBLICATIONS

Annotated drawing: HT-SDT02.FIG/HOM.-FIL/CJH/6/27/91-2.
Annotated drawing: HTSDT02A/6/23/91/HOM.FIL.
Annotated drawing: Bearcat Drive Fixture and Drive Plate.
Annotated drawing: HT-SDT03.FIG/HOM.-FIL/CJH/6/27/91.
Annotated drawing: HT-SDT01.FIG 6/26/91, C. J. Hayes.
Annotated drawing: HT-SDT02.FIG/HOM.-FIL/CJH/6/27/91-1.

*Primary Examiner*—Jack W. Lavinder
*Attorney, Agent, or Firm*—Browning, Bushman, Anderson & Brookhart

[57] ABSTRACT

Portable shoulder dressing apparatus is disclosed for dressing shoulders on threaded ends of tubular connections. The shoulder dressing tool, either of the box type or pin type, uses primary and/or secondary cutters to remove material from seal and/or stop shoulders of the tubular connection either simultaneously or on a single shoulder. The shoulder dressing tool includes a mandrel that is threadably secured to the threaded end of the tubular connection. A piston and cutter bar are fixably secured together for holding primary and secondary cutter blades. The piston, cutter bar, and cutters are mounted for axial and rotational movement with respect to the mandrel. A compression chamber is activated, either hydraulically or pneumatically, to provide a biasing force to urge the cutters axially into contact with the shoulders to be dressed. An axially adjustable stop including a stop roller is used to set a travel length that determines the amount of material removed from the shoulders. The shoulder dressing tool may be operated either manually or automatically.

22 Claims, 5 Drawing Sheets

SHOULDER DRESSING APPARATUS

BACKGROUND OF THE INVENTION

1. Field of the Invention

The present invention relates to an apparatus for dressing shoulders on tubular threaded connections. More particularly, the present invention relates to a portable shoulder dressing apparatus operable for dressing two shoulders simultaneously.

2. Description of the Background

Tubular goods used as drill pipe for drilling a well typically include tubular connectors for threadably interconnecting the drill pipes together. Certain types of tubular connectors include two shoulders on each connector. One of these shoulders, the seal shoulder, provides a seal that may be a relatively high pressure seal and also acts to preload the threaded connection. The other shoulder acts as mechanical stop to minimize damage from over-torquing of the connection.

The two shoulders on each connector must be smooth, flat and parallel to each other. The axial distance between the two shoulders, referred to as pin length or box depth, is important for proper operation of the connection. A typical tolerance on the axial distance may be in the range of $+0.000$ inches and $-0.005$ inches. The primary shoulder or seal shoulder is the radially outermost shoulder on the connector. The secondary shoulder or stop shoulder is radially inwardly disposed with respect to the seal shoulder.

The shoulders may require redressing for a number of reasons including the following reasons: (a) They can become damaged and will not seal the drilling fluid that is pumped, under pressure, through the drill pipe; (b) they become damaged in such a way that a mating, or corresponding shoulder becomes damaged; (c) the pin length or box depth has changed because of over-torquing during makeup of the drill string and subsequent yielding of the pin nose or box counterbore; and when the seal shoulder of a pin or box is redressed, the stop shoulder on that member may also need to be redressed to maintain the correct pin length or box depth.

In the past, when redressing was required, it was necessary for the operator to send the drill pipe to a machine shop for repair work. Transportation costs, machining costs, and loss of length from recutting were disadvantages associated with redressing the shoulders. Specifically designed shoulder dressing tools were expensive and bulky so as to effectively prohibit field use of such dressing tools.

Consequently, there remains the need for an improved shoulder dressing tool that is portable, dependable, provides the accuracy necessary in shoulder dressing, and that may be obtained and operated at reduced levels of capital investment. Those skilled in the art have long sought and will appreciate the present invention, which provides solutions for these and other problems.

SUMMARY OF THE INVENTION

The portable shoulder dressing apparatus of the present invention may be used for dressing at least one shoulder of a tubular connection having a threaded end portion and first and second axially spaced, axially facing shoulders. The shoulder dressing apparatus includes a mandrel with mandrel securing means for securing the mandrel to the threaded end portion of the tubular connection. A piston assembly is provided that is adapted to carry two axially spaced cutters. The piston assembly is axially and rotatably movable relative to the mandrel. At least one cutter is carried by the piston assembly. Biasing means are used to apply a biasing force on the piston assembly so as to urge the cutter in the direction of the shoulder or shoulders to be dressed. Rotating means are provided for rotating the piston assembly while the piston assembly moves axially with respect to the mandrel.

Therefore, an object of the present invention is to provide an improved shoulder dressing apparatus.

Another object of the present invention is to provide a shoulder dressing tool that will dress two shoulders simultaneously, or in the alternative, is operable for dressing a single shoulder.

Still another object of the present invention is to provide a relatively light weight, low cost, shoulder dressing apparatus suitable for field operation.

A feature of the present invention is a threadable mandrel to secure the shoulder dressing tool of the present invention in place on the threadable connection for dressing.

Another feature of the present invention is a rotatable and axially movable piston for urging the cutters against one or more shoulders of the threaded connection to be dressed.

Still another feature of the present invention is a non-adjustable fixed axial length on the piston assembly between the axially spaced cutters equal to the pin length or box depth to avoid the need and problems associated with axial length adjustment of the cutters.

An advantage of the present invention is a relatively low cost shoulder dressing tool.

Another advantage of the present invention is a shoulder dressing tool that may be manually or automatically operated.

Other objects, features and intended advantages of the present invention will be more readily apparent by reference to the following detailed description in connection with the accompanying drawings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

The present invention provides generally for a portable, highly accurate shoulder dressing tool that is low cost and relatively light weight for field operation. While the present invention is described in terms including axial and radial directions with respect to the general axis of the tubular member or other similarly oriented members such as the mandrel, such terms are used for descriptive purposes only and should not be interpreted in any manner as limiting the invention.

Figure 1:
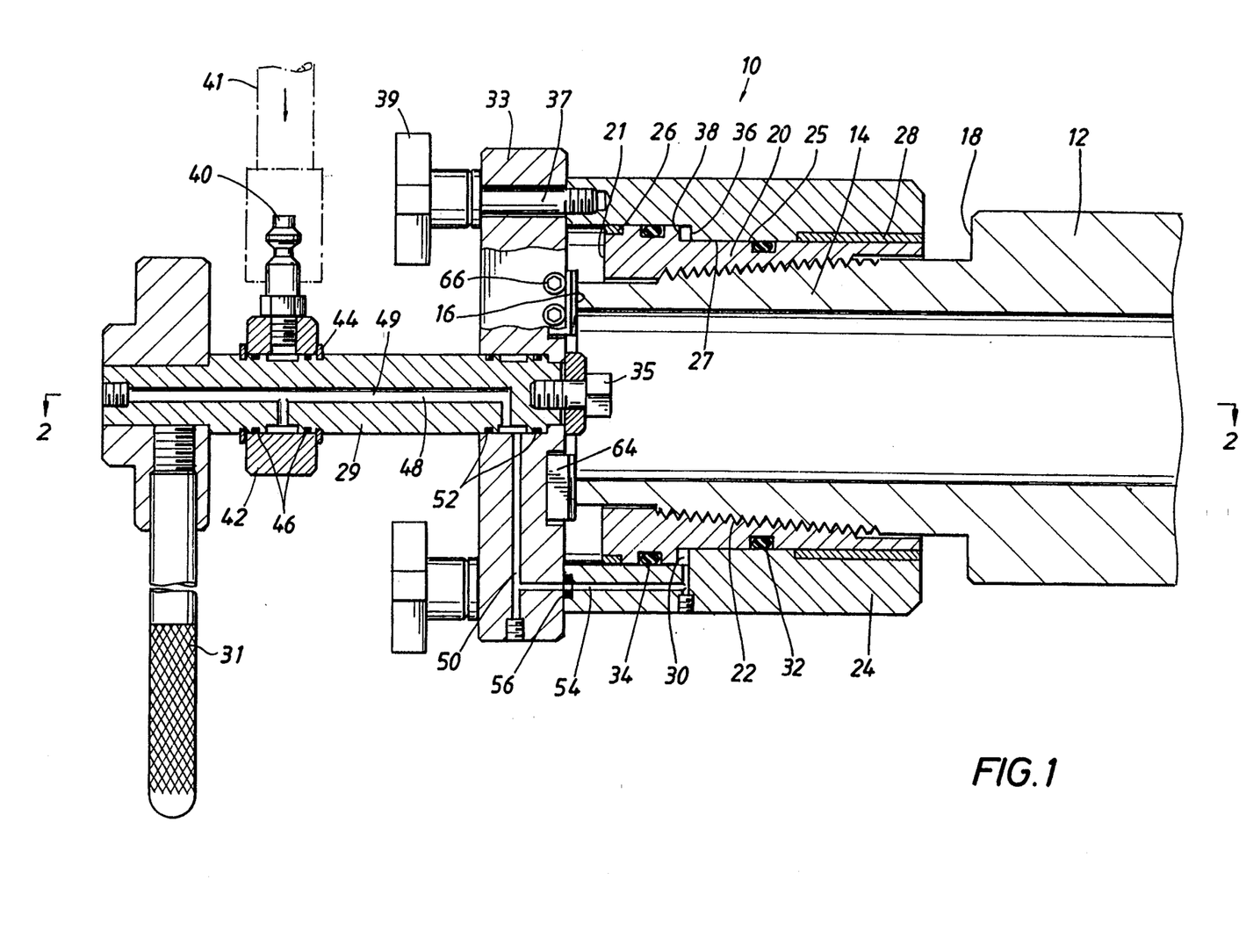
FIG. 1 is an elevational view, partially in section, of a pin shoulder dressing tool in accord with the present invention.
Figure 2:
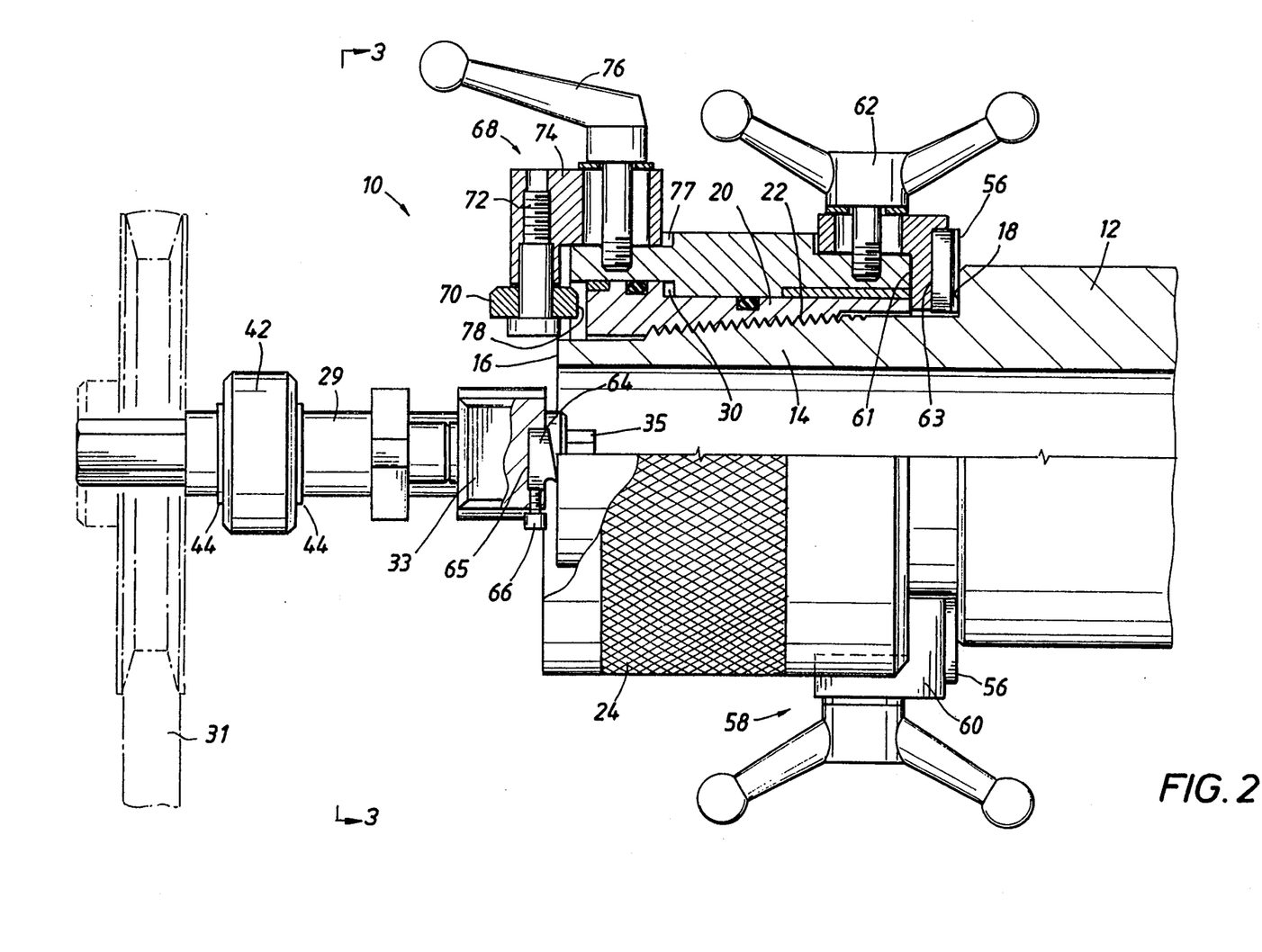
FIG. 2 is an elevational view, partially in section, taken along lines 2—2 of FIG. 1.
Figure 3:
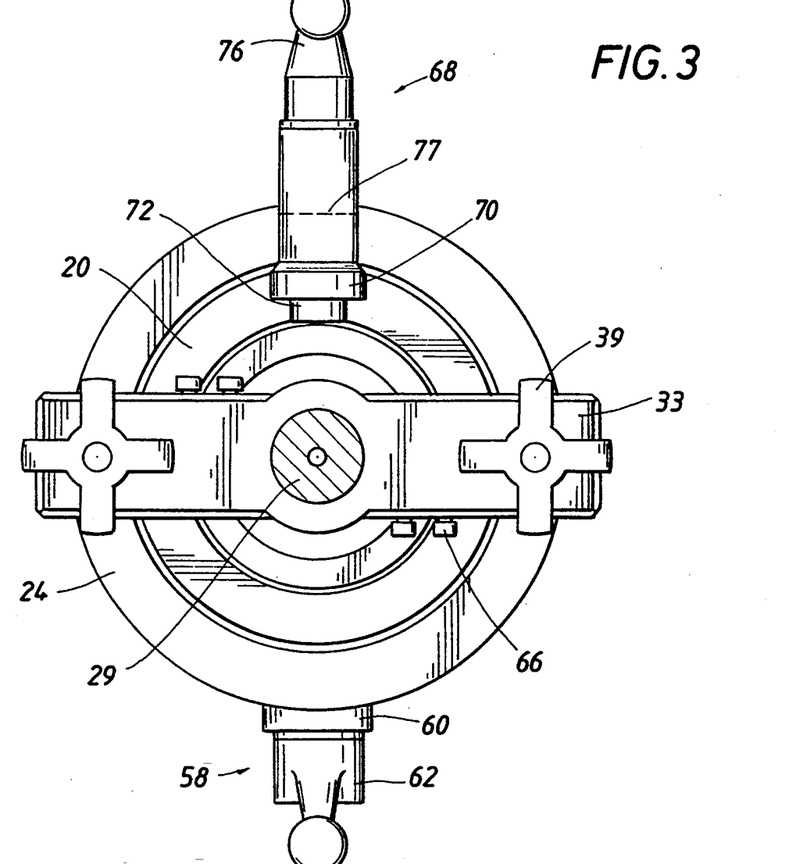
FIG. 3 is an elevational view, partially in section, taken along the lines 3—3 of FIG. 2.
Figure 4:
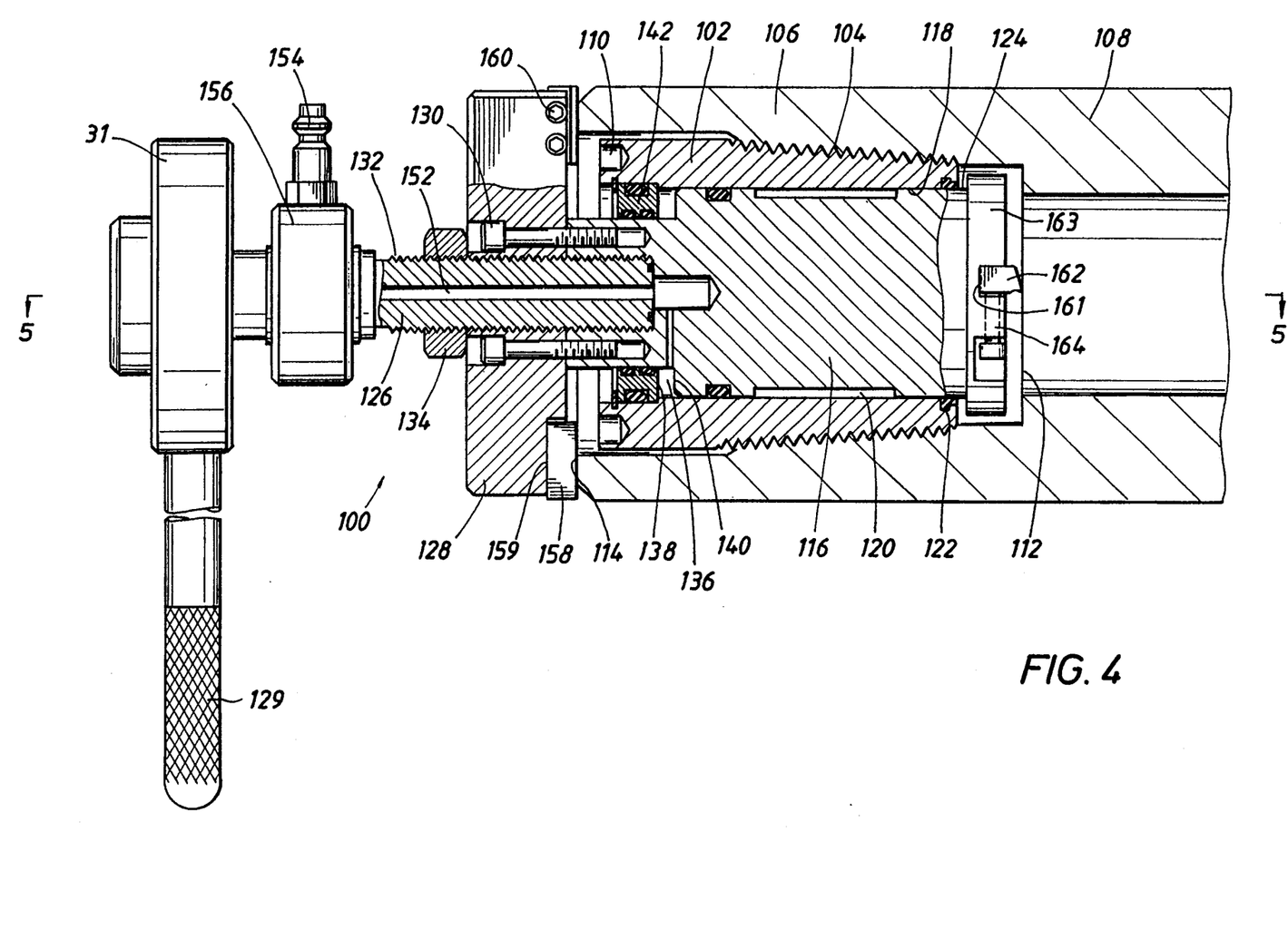
FIG. 4 is an elevational view, partially in section, of a box shoulder dressing tool in accord with the present invention.
Figures 5, 7:
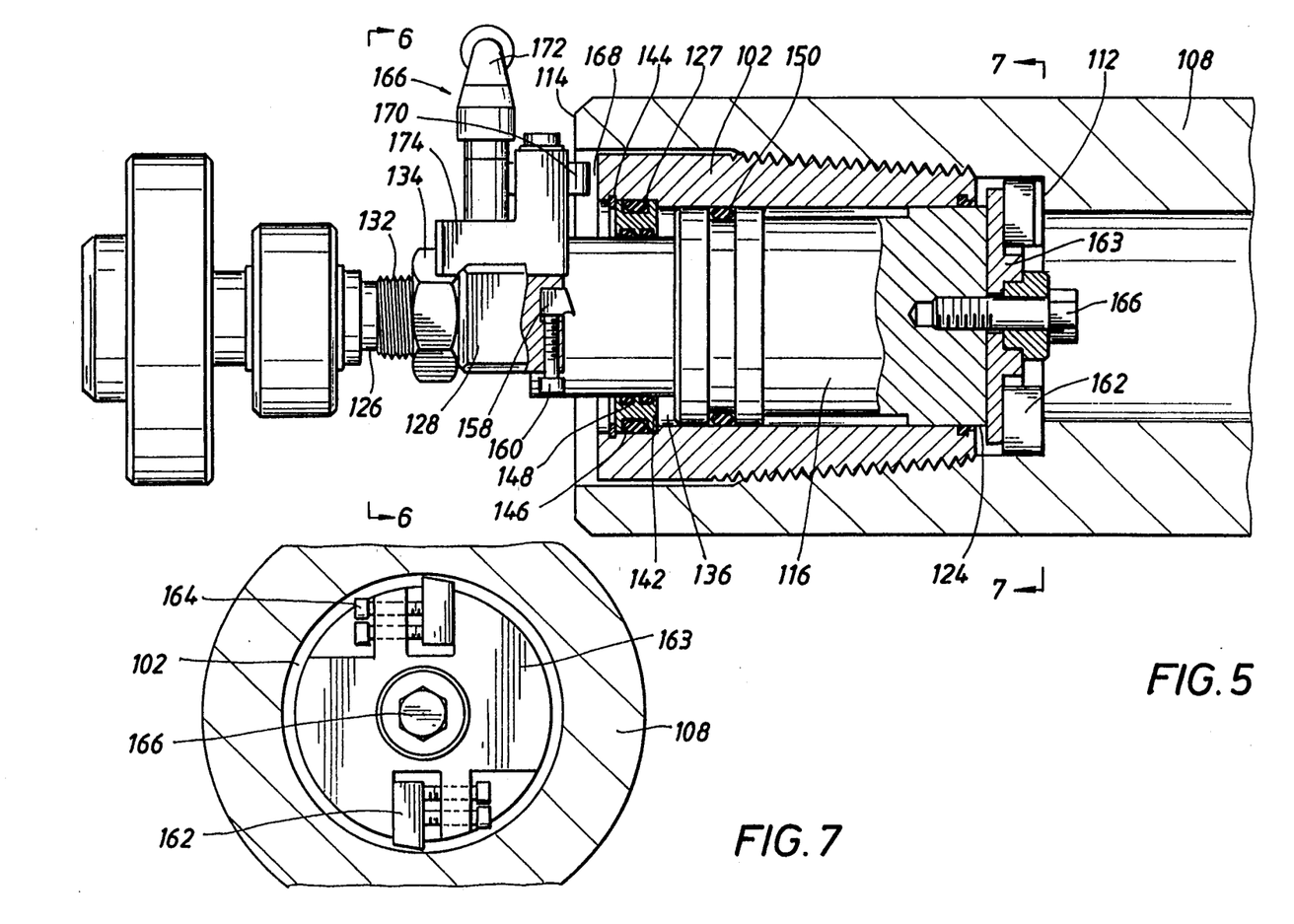
FIG. 5 is an elevational view, partially in section, taken along the lines 5—5 of FIG. 4.
FIG. 7 is an elevational view, partially in section, taken along the lines 7—7 of FIG. 5.
Figure 6:
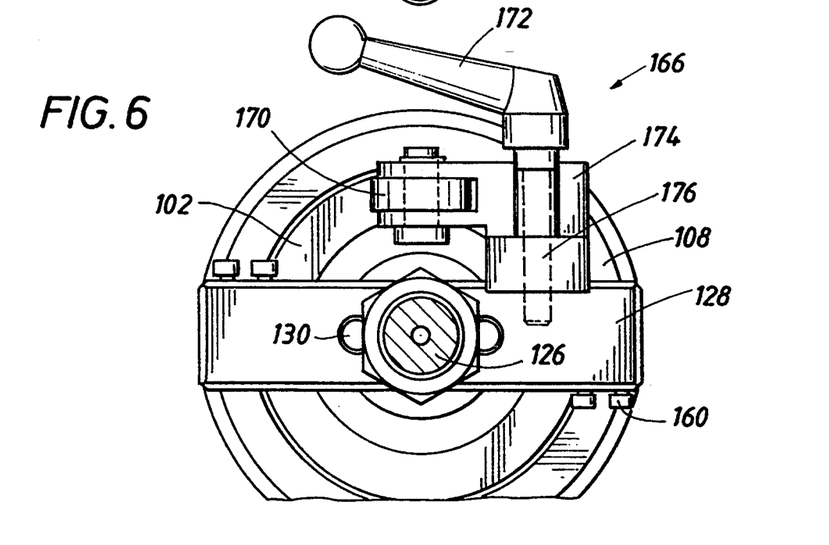
FIG. 6 is an elevational view, partially in section, taken along the lines 6—6 of FIG. 5.

Referring now to the drawings, and more particularly, to FIG. 1-3, there is shown pin shoulder dressing tool 10 for dressing pin tubular connection 12 having threaded portion 14. Pin shoulder dressing tool 10 refaces pin nose (stop) shoulder 16 or pin seal shoulder 18 or both shoulders simultaneously. Pin mandrel 20 has a threaded inner surface 22 for threadably engaging and fixably securing pin mandrel 20 to pin tubular connection 12 during the dressing operation. Although threads are used for securing the mandrel to the threaded connection in a presently preferred embodiment, other means for securing including clamping to an external surface or to the bore of the threaded connection could also be used. Outer piston 24 surrounds pin mandrel 20 and is axially and rotatably movable with respect to pin mandrel 20 along bushings 26 and 28, which are, in a presently preferred embodiment, bronze bushings. Outer piston 24 has a bore therethrough with bore surface 25 that moves along an outer cylindrical surface 27 of pin mandrel 20 as carried by the bronze bushings.

Drive shaft 29 provides a means for rotating outer piston 24 during the dressing operation. Drive shaft 29 may be driven either manually using one or more handles such as handle 31 or powered driving means (not shown, e.g., electric motor). Drive shaft 29 is fixably mounted to outer piston 24 via cutter bar 33. Drive shaft 29 is secured to cutter bar 33 using bolt 35. Bolts 37, which are conveniently driven using knobs 39, secure cutter bar 33 to outer piston 24. Thus, after pin mandrel 20 and outer piston 24 are mounted for operation to threaded connector 12, drive shaft 29 and cutter bar 33 are readily connected to outer piston 24 with bolts 37 using knobs 39.

Between pin mandrel 20 and outer piston 24 is formed compression chamber 30 into which a fluid, in either a gaseous and/or liquid state, may be introduced to provide pneumatic and/or hydraulic pressure for biasing piston 24 in an axial direction with respect to pin mandrel 20. O-rings 32 and 34 are axially spaced from each other and positioned on opposite sides of compression chamber 30 for sealing compression chamber 30. Opposed walls 36 and 38 move axially and rotate with respect to each other as piston 24 moves axially and rotates with respect to pin mandrel 20. While fluid is preferably used to provide the pressure for biasing piston 24, an annular spring could also be used.

Quick connector 40, which preferably may be of a type for receiving compressed gas or liquids, is connected to line 41, which is normally available in the field where shoulder dressing operations are preferably commenced. Quick connector 40 is rotatably mounted on drive shaft 29 by rotatable joint 42, which allows rotation of drive shaft 42 during axial movement caused by compression chamber 30 as discussed hereinafter. Rotatable joint 42 is axially fixed in position by snap rings 44 on either side of rotatable joint 42. O-rings 46 provide sealing for rotatable joint 42. Fluid passageway 48 has a drive shaft fluid passageway portion 49 that extends radially from quick connector 40 and axially through drive shaft 29. Fluid passageway 48 then connects to cutter bar fluid passageway portion 50. The connection between drive shaft fluid passageway portion 49 and cutter bar fluid passageway portion 50 is sealed by O-rings 52. Cutter bar fluid passageway portion 50 connects to pin mandrel fluid passageway portion 54 and is sealed by nylon seal ring 56. Pin mandrel fluid passageway portion 54 then leads to compression chamber 30.

The presently preferred level of pressure for biasing outer piston 24 is preferably in the range of about 25 pounds per square inch although this may vary somewhat for varying diameters of dressing tools that also vary the surface areas of walls 36 and 38, which move axially in response to pressure within compression chamber 30. For larger diameter shoulder dressing tools, it may be more desirable to use hydraulic pressure to avoid vibration such as chattering during the dressing operation. Pneumatic pressure may be too springy for some dressing operations. These considerations also hold true for box shoulder dressing tool 100 discussed hereinafter.

Primary cutter blades 56, which may be comprised of tool steel, are used to dress or remove material from seal shoulder 18. While the presently preferred embodiment uses blades for the dressing operation, other metal removing means such as abrasives or abrasive elements could be used. Primary cutter blades 56 are readily mounted to outer piston 24 using primary cutter assembly 58, which includes slotted housing and securing nut 62. Secondary cutter blades 64 are mounted to cutter bar 33 using bolts 66. In a presently preferred embodiment, there are two primary cutter blades and two secondary cutter blades. Primary cutter blades 56 and secondary cutter blades 62 are thus fixably mounted with respect to outer piston 24 and move axially and circularly with respect to pin mandrel 20. Primary cutter blades 56 and secondary c, utter blades 64 are axially fixed to the respective pin length of the connection with an accuracy necessary for the tolerances, which are typically within several thousandths of an inch. Housing 60 is readily secured to shoulder 61 to set this axial length. The length between the bottom of slot 65 and slot 63 is fixed to the desired pin length or box depth within the desired tolerances.

To increase stability of operation, the primary and secondary blades are disposed at right angles to each other. Although the blades are mounted normal to the direction of rotation in the presently preferred embodiment, they could also be mounted at an offset angle if desired for purposes such as increasing stability of operation. If it is desired to dress only one shoulder, then the corresponding blades tier the other shoulder may be readily removed.

Slidably mounted to outer piston 24 is stop assembly 68, which includes stop roller 70, stop roller axle bolt 72, slotted stop housing 74 and stop adjustment bolt handle 76. Stop assembly 68 is used to control the amount of material removed from the shoulders. If handle 76 is loosened so that slotted stop housing moves in slot 77 in outer piston 24, then space 78 between stop roller 70 and pin mandrel 20 may be calibrated for a specific axial length that may be determined with a feeler gauge (not shown), shim stock, or other means. Handle 76 is then tightened to fix the axial length of travel. Thus, the cutters may rotate and remove material from the shoulders until stop roller 70 engages pin mandrel 20 whereupon axial movement of the cutters in the direction of the shoulders is prevented.

In operation, a force, normal to the surface of shoulders 16 and 18 is applied to primary and secondary cutter blades 56 and 64, respectively, with hydraulic or pneumatic pressure acting in compression chamber 30 bounded by outer piston 24 and mandrel 20. The cutters are rotated about an axis concentric with tool joint 12 by manually turning handle (or handles) 31, or with a powered tool (not shown). Handle 31 is attached to drive shaft 29. Drive shaft 29 is attached to cutter bar 33 and to outer piston 24. Secondary cutters 64, which resurface the pin nose surface 16, are attached to cutter bar 33. Primary cutters 56, which resurface seal shoulder 18, are attached to primary cutter assembly 58. Primary cutter assembly 58 is attached to outer piston 24.

The amount of material removed from the shoulders is proportional to the distance the cutters travel parallel to the thread axis (axial movement) after they have come into contact with the shoulders. The amount of material removed is controlled by stop roller 70, in the following manner:

(1) The cutters (56 and/or 64) are axially positioned so that they are in contact with tool joint pin nose 16 and/or seal shoulder 18.

(2) The stop roller 70 is positioned by loosening stop adjustment handle 76 to allow stop assembly 68 to move axially.

(3) A feeler gage or shim stock or a thickness equal to the desired axial travel of the cutters (commonly stated as "amount of material to be removed") is placed between stop roller 70 and mandrel 20 stop surface 21. Stop adjustment handle 76 is tightened.

(4) As the cutters (56 and/or 64) remove material from the seal shoulder and/or pin nose, outer piston 24 advances axially. When outer piston 24 has advanced an axial distance equal to the gap between stop roller 70 and stop surface 21 of mandrel 20, the stop roller will contact the mandrel and prevent further axial movement. When outer piston 24 can no longer advance, the cutters will cease to remove material from the shoulders.

Referring now to FIG. 4–7, box shoulder dressing tool 100 operates in a similar manner as pin shoulder dressing tool 10 to dress box tubular connection 108. Box mandrel 102 has a threaded outer surface 104 that mates to threaded end 106 of box tubular connection 108. Drive holes 110 may be used to fasten box mandrel 102 tightly with respect to box tubular connection 108. Similar holes (not shown) may be used for the same purpose with respect to pin shoulder dressing tool 10. Box shoulder dressing tool 100 refaces or removes material from stop shoulder 112, or seal shoulder 114, or both shoulders simultaneously.

Inner piston 116 moves axially and rotationally with respect to box mandrel 102 in bore 118 that extends axially through box mandrel 102. Annular volume 120 may be used to facilitate relative movement between box mandrel 102 and inner piston 116 by holding lubrication. Wiper 122 prevents accumulation of lubrication on outer cylindrical surface 124 of inner piston 116.

Drive shaft 126 is fixed to piston rod 127 of inner piston 116 and cutter bar 128 and provides a means for rotatably driving inner piston 116 either manually or automatically. In the presently preferred embodiment, piston rod 127 and inner piston 116 are formed in a one-piece, essentially monolithic unit. Handle 129, and handle adaptor 131 for connecting handle 129 to drive shaft 126, are shown for driving inner piston 116 manually. Bolts 130, threads 132 on drive shaft 126, and nut 134 are used to fixably secure drive shaft 126, inner piston 116, and cutter bar 128 together.

Between box mandrel 102 and inner piston 116 is compression chamber 136 defined by axially opposing walls 138 and 140. Wall 138 is an inner surface of pressure ring 142. Pressure ring 142 is prevented from axial away from box connection 108 by snap ring 144. O-rings 146 and 148 on pressure ring 142 and O-ring 150 on inner piston 116 seal compression chamber 136.

Fluid passageway 152 extends through drive shaft 126 and inner piston 116 to provide pressurized communication with compression chamber 136 in a manner similar to that discussed in connection with pin dressing tool 10. Quick connector 154 and rotatable joint 156 are similar in construction to their counterparts in pin dressing tool 10. The connectors may be placed in a different position and may be shaped differently as desired for ease of connecting to a source of pressurized fluid i.e., gas and/or liquid.

A pair of primary cutter blades 158 are affixed to cutter bar 128 with bolts 160. A pair of secondary cutter blades 162 are affixed to cutter assembly plate 163 with bolts 164. Cutter assembly plate 163 is affixed to inner piston 116 by bolt 166. The axial length between the cutter blades is fixed by the bottom of slot 159 and slot 161 to provide a fixed axial length within the desired tolerances. As in pin shoulder dressing tool 10, the primary and secondary blades are positioned at right angles to each other. If only one shoulder is desired to be dressed, the cutter blades for the other shoulder may be readily removed prior to installation.

Stop assembly 166 is slidably affixed to cutter bar 128 and may be moved axially so as to set an axial distance in space 168 using a feeler gage or shim stock or other means in a similar manner as explained with respect to pin shoulder dressing tool 10. Stop assembly 166 includes stop roller 170, adjustment handle 172 for tightening bolt 176, and slotted stop housing 174.

Box shoulder dressing tool 100 refaces or removes material from stop shoulder 112, seal shoulder 114, or both shoulders simultaneously.

In operation, a force, normal to the surface of shoulders 112 and 114 is applied to cutters 158 and 162 with hydraulic or pneumatic pressure acting in compression chamber 136. The cutters (158 and/or 162) are rotated about an axis concentric with tool joint 108 thread axis by manually turning handle (or handles) 129, or with a powered tool (not shown). Handle 129 or the power tool is attached to drive shaft 126. Drive shaft 126 is affixed to inner piston 116. Cutter bar 128 is also attached to inner piston 116. Primary cutter blades 158 are attached to cutter bar 128 for resurfacing seal shoulder 114. Secondary cutter blades 162 for resurfacing stop shoulder 112 are attached to inner piston 116.

As on the pin shoulder dressing tool 10, the amount of material removed from the shoulders is proportional to the distance the cutters travel parallel to the thread axis (axial movement) after they have come in contact with the shoulders. The amount of material removed is controlled by stop roller 170 in the following manner:

(1) Cutters 158 and/or 162 are axially positioned so that they are in contact with the respective stop shoulder and/or seal shoulder.

(2) Stop roller 170 is positioned by loosening roller adjustment handle 172 to allow stop assembly 166 to move axially.

(3) A feeler gage or shim stock of a thickness equal to the desired amount of axial travel of the cutters (commonly stated as "the amount of material to be removed") is placed between stop roller 170 and mandrel 102. Roller adjustment handle 172 is tightened.

(4) As the cutters 158 and/or 162 remove material from the respective shoulders, inner piston 116 advances axially. When inner piston 116 has advanced a distance equal to the gap between stop roller 170 and mandrel 102, then inner piston 116 will contact mandrel 102 and prevent further axial movement of the cutters. When inner piston 116 can no longer advance, the cutters will cease to remove material from the shoulders.

One feature that makes this invention simple to operate, low cost to manufacture and accurate is the absence of a need to adjust for the pin length or box depth, i.e., the distance between the cutter sets. The two sets of cutter blades are mounted on axially spaced rigid mounting members, as described hereinbefore in connection with the pistons and cutter bars, which virtually eliminates any relative axial movement between the two sets of axially spaced blades.

The foregoing disclosure and description of the invention is illustrative and explanatory thereof, and it will appreciated by those skilled in the art, that various changes in the size, shape and materials as well as in the details of the illustrated construction or combinations of features of the various shouldering tool elements may be made without departing from the spirit of the invention.

What is claimed is:

1. A shoulder dressing apparatus for dressing at least one shoulder of a tubular connection having a threaded end portion and at least one axially spaced, axially facing shoulders comprising:
    a mandrel;
    a mandrel securing means for securing said mandrel to said threaded end portion of said tubular connection;
    a piston assembly, said piston assembly being axially and rotatably movable relative to said mandrel;
    at least one cutter carried by said piston assembly;
    biasing means for applying a biasing force to said piston assembly to move said piston assembly axially relative said at least one shoulder and to urge said cutter into contact with said at least one shoulder, said biasing means being disposed between said mandrel and said piston assembly; and
    rotating means for rotating said piston assembly while said piston assembly is moved axially whereby said cutter can remove material from said at least one shoulder.

2. The apparatus of claim 1, wherein said piston assembly further comprises a cylindrical portion with a nose end and a radially extending member securable with respect to said cylindrical portion opposite said nose end, said nose end carrying said at least one cutter, said radially extending member carrying a second cutter axially spaced from said at least one cutter.

3. The apparatus of claim 2, wherein said radially extending member extends in a radially inwardly direction with respect to an outer diameter of said cylindrical portion.

4. The apparatus of claim 1, further comprising adjustable stop means operable for selecting a predetermined axial length of movement of said at least one cutter with respect to said mandrel and for automatically stopping axial movement of said at least one cutter after said at least one cutter has traveled said predetermined axial length.

5. The apparatus of claim 1, further comprising a stop means for stopping axial movement of said at least one cutter including a stop roller for rolling engagement with a planar stop surface, said stop roller and said planar stop surface being operable for automatically limiting axial movement of said piston assembly.

6. The apparatus of claim 1, further comprising a stop means for stopping axial movement of said at least one cutter including an adjustable stop element affixed with respect to said piston assembly for rotational and axial movement with said piston assembly.

7. The apparatus of claim 1, wherein said mandrel securing means include threads disposed on said mandrel for threading said mandrel onto said threaded end portion of said tubular connection.

8. The apparatus of claim 1, wherein said mandrel is profiled to provide an axial space adjacent said at least one shoulder for receiving said at least one cutter.

9. The apparatus for claim 1, wherein said biasing means further comprises a compression chamber provided between said mandrel and said piston assembly operable for applying said biasing force on said piston assembly.

10. The apparatus of claim 9, wherein said compression chamber is defined by walls axially spaced from each other and axially and rotatably movable with respect to each other, and a fluid passageway in communication with said compression chamber.

11. The apparatus of claim 9, wherein said mandrel includes a mandrel fluid passageway portion extending through said mandrel and in communication with said compression chamber.

12. The apparatus of claim 9, wherein said rotating means for rotating said piston assembly comprises a drive shaft affixed with respect to said piston assembly for providing a rotation force to said piston assembly, and means for rotationally driving said drive shaft, said drive shaft having a drive shaft fluid passageway portion extending through said drive shaft and in communication with said compression chamber.

13. The apparatus of claim 12, further comprising:
    a rotatable fluid pressure connector disposed along said drive shaft for sealing communication with said drive shaft fluid passageway portion, said rotatable fluid pressure connector being rotatable with respect to said drive shaft.

14. The apparatus of claim 9, further comprising means for introducing a fluid into said compression chamber.

15. The apparatus of claim 1, wherein said rotating means for rotationally driving said piston assembly includes a drive shaft and a handle secured to said drive shaft operable for manual rotation of said drive shaft.

16. The apparatus of claim 1, wherein said piston assembly includes a portion disposed radially outwardly with respect to said mandrel.

17. The apparatus of claim 1, wherein said at least one cutter is a blade.

18. The apparatus of claim 1, further comprising a second axially spaced cutter mounted for a non-adjustable axial spacing from said at least one cutter on said piston assembly.

19. A shoulder dressing apparatus for dressing at least one shoulder of a tubular connection having a threaded end portion and at least one axially spaced, axially facing shoulder, comprising:
- a mandrel;
- a mandrel securing means for securing said mandrel to said threaded end portion of said tubular connection;
- a piston assembly, said piston assembly being axially and rotatably movable relative to said mandrel;
- at least one cutter carried by said piston assembly;
- biasing means for applying a biasing force to said piston assembly to move said piston assembly axially relative said at least one shoulder and to urge said at least one cutter into contact with said at least one shoulder;
- rotating means for rotating said piston assembly while said piston assembly is moved axially whereby said at least one cutter can remove material from said at least one shoulder; and
- a stop means for stopping axial movement of said at least one cutter including a stop roller for rolling engagement with a planar stop surface that is axial fixed with respect to the mandrel, said stop roller and said planar stop surface being operable for automatically limiting axial movement of said piston assembly.

20. The apparatus of claim 19, wherein said biasing means further comprises a compression chamber defined by walls axially and rotatably movable with respect to each other.

21. A shoulder dressing apparatus for dressing at least one shoulder of a tubular connection having a threaded end portion and at least one axially spaced, axially facing shoulder, comprising:
- a mandrel;
- a mandrel securing means for securing said mandrel to said threaded end portion of said tubular connection;
- a piston assembly, said piston assembly being axially and rotatably movable relative to said mandrel;
- at least one cutter carried by said piston assembly;
- a compression chamber disposed adjacent said piston assembly for applying a biasing force to said piston assembly to move said piston assembly axially relative said at least one shoulder and to urge said cutter into contact with said at least one shoulder; and
- a drive shaft for rotating said piston assembly while said piston assembly is moved axially whereby said cutter can remove material from said at least one shoulder, said drive shaft having a drive shaft fluid passageway portion extending through said drive shaft and in communication with said compression chamber.

22. The apparatus of claim 21, further comprising:
- a rotatable fluid pressure connector disposed along said drive shaft for sealing communication with said drive shaft fluid passageway portion, said rotatable fluid pressure connector being rotatable with respect to said drive shaft.

* * * * *